United States Patent
Zhang

(10) Patent No.: US 11,026,244 B2
(45) Date of Patent: Jun. 1, 2021

(54) METHOD AND DEVICE IN TERMINAL AND BASE STATION FOR DYNAMIC SCHEDULING

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 9 days.

(21) Appl. No.: 16/533,809

(22) Filed: Aug. 7, 2019

(65) Prior Publication Data

US 2019/0364578 A1 Nov. 28, 2019

Related U.S. Application Data

(63) Continuation of application No. PCT/CN2017/073084, filed on Feb. 8, 2017.

(51) Int. Cl.
*H04W 72/12* (2009.01)
*H04L 1/00* (2006.01)
(Continued)

(52) U.S. Cl.
CPC ............ *H04W 72/12* (2013.01); *H04L 1/004* (2013.01); *H04L 1/0009* (2013.01);
(Continued)

(58) Field of Classification Search
CPC ...... H04W 72/12; H04L 1/0009; H04L 1/004; H04L 1/1812; H04L 5/0005; H04L 5/0046
See application file for complete search history.

(56) References Cited

U.S. PATENT DOCUMENTS

| 2008/0049668 A1* | 2/2008 | Kakura | H04W 72/042 370/329 |
| 2008/0219219 A1* | 9/2008 | Sartori | H04L 1/0009 370/335 |

(Continued)

FOREIGN PATENT DOCUMENTS

| CN | 103731236 A | 4/2014 |
| CN | 106160987 A | 11/2016 |

(Continued)

OTHER PUBLICATIONS

ISR received in application No. PCT/CN2017/073084 dated Oct. 26, 2017.

(Continued)

*Primary Examiner* — Phong La
(74) *Attorney, Agent, or Firm* — Maschoff Brennan

(57) ABSTRACT

The disclosure provides a method and a device in a terminal and a base station for dynamic scheduling. The UE detects a first bit block in a first time-frequency resource set and a second bit block in a second time-frequency resource set. The first bit block includes a first and a second bit sub-block, the first bit sub-block is for generating the second bit sub-block. The second bit block includes a third and a fourth bit sub-block, and the third bit sub-block is for generating the fourth bit sub-block; or the second bit block includes a third bit sub-block which does not include CRC bits. The first and the second bit block are associated. Bits in the second bit sub-block is greater than bits in the fourth bit sub-block. The disclosure effectively reduce number of check bits in control signalings, thereby reducing overheads of control signalings and improving spectrum efficiency.

16 Claims, 5 Drawing Sheets

(51) Int. Cl.
*H04L 1/18* (2006.01)
*H04L 5/00* (2006.01)

(52) U.S. Cl.
CPC .......... *H04L 1/1812* (2013.01); *H04L 5/0005* (2013.01); *H04L 5/0046* (2013.01)

(56) References Cited

U.S. PATENT DOCUMENTS

| | | | | |
|---|---|---|---|---|
| 2010/0115358 | A1* | 5/2010 | Kotecha | H04L 1/1812 714/748 |
| 2011/0134968 | A1* | 6/2011 | Han | H04L 5/0023 375/146 |
| 2012/0113842 | A1* | 5/2012 | Zhang | H04B 7/0626 370/252 |
| 2012/0113884 | A1* | 5/2012 | Park | H04L 5/0094 370/312 |
| 2013/0128854 | A1* | 5/2013 | Nakashima | H04L 1/1861 370/329 |
| 2013/0252606 | A1* | 9/2013 | Nimbalker | H04B 17/309 455/434 |
| 2014/0321399 | A1* | 10/2014 | Liu | H04L 5/0053 370/329 |
| 2014/0342746 | A1* | 11/2014 | Nakashima | H04W 72/0406 455/450 |
| 2015/0146670 | A1* | 5/2015 | Liu | H04L 5/0007 370/329 |
| 2015/0280881 | A1* | 10/2015 | Gao | H04L 5/0053 370/329 |
| 2015/0319768 | A1* | 11/2015 | Abdelmonem | H04J 11/0066 455/452.1 |
| 2015/0326356 | A1* | 11/2015 | Guan | H04L 5/005 370/330 |
| 2016/0094327 | A1* | 3/2016 | Han | H04W 72/0413 370/329 |
| 2016/0262133 | A1* | 9/2016 | Yang | H04W 72/042 |
| 2017/0163404 | A1* | 6/2017 | Liu | H04W 72/042 |
| 2017/0201982 | A1* | 7/2017 | Rico Alvarino | H04L 5/0007 |
| 2017/0238312 | A1* | 8/2017 | Chen | H04L 5/0051 370/329 |
| 2017/0366299 | A1* | 12/2017 | Li | H04L 5/00 |
| 2018/0145796 | A1* | 5/2018 | Liang | H04L 1/1861 |
| 2018/0198894 | A1* | 7/2018 | Nammi | H03M 13/2906 |
| 2018/0206206 | A1* | 7/2018 | Tie | H04W 68/00 |
| 2018/0206246 | A1* | 7/2018 | Zhang | H04W 72/085 |
| 2018/0241416 | A1* | 8/2018 | Axmon | H03M 13/093 |
| 2018/0309532 | A1* | 10/2018 | Shimezawa | H04L 1/1887 |
| 2019/0028225 | A1* | 1/2019 | Yang | H04L 1/1822 |
| 2020/0196388 | A1* | 6/2020 | Zhang | H04B 7/0626 |

FOREIGN PATENT DOCUMENTS

| | | |
|---|---|---|
| CN | 106162907 A | 11/2016 |
| WO | 2016021699 A1 | 2/2016 |

OTHER PUBLICATIONS

1st Office Action Received in application No. 201780068837.1 dated Nov. 4, 2020.
1st Search Report Received in application No. 201780068837.1 dated Oct. 27, 2020.

* cited by examiner

METHOD AND DEVICE IN TERMINAL AND BASE STATION FOR DYNAMIC SCHEDULING

CROSS-REFERENCE TO RELATED APPLICATION

This application is a continuation of International Application No. PCT/CN2017/073084, filed Feb. 8, 2017, the full disclosure of which is incorporated herein by reference.

BACKGROUND

Technical Field

The disclosure relates to transmission methods and devices in wireless communication systems, and in particular to a transmission method and device for dynamic scheduling.

Related Art

In existing Long Term Evolution (LTE) systems, dynamic schedulings of downlink data and uplink data are accomplished through a downlink grant and an uplink grant respectively. Scheduling information of data corresponding to one time of grant is indicated by one piece of Downlink Control Information (DCI).

In the subject of reduced latency in 3rd Generation Partner Project (3GPP) Release 14 and the 5G discussions orienting future mobile communications, a two-stage DCI is widely discussed. Compared with existing scheduling modes, the two-stage DCI accomplishes data transmission corresponding to one time of scheduling through two associated DCIs. Meanwhile, 3GPP has determined to use polar code as a control channel coding scheme of 5G enhanced Mobile Broadband (eMBB) scenarios. In conventional LTE systems, a Cyclic Redundancy Check (CRC) plays a special function such as error check, identification of a target receiver, etc. For polar code and the introduced two-stage DCI, a corresponding new error check method needs to be considered.

SUMMARY

In existing LTE systems, a UE acquires scheduling information carried by a DCI through multiple times of blind decoding. In order to ensure the UE knows that the DCI blind decoded is correct, that is, to reduce a probability of false alarms, a CRC part with a fixed length is introduced into the DCI. A number of bits in the CRC part is related to a number of times of blind decoding supported by the UE and the probability of false alarms. When a two-stage DCI is introduced, the two stages of DCIs correspond to different numbers of times of blind decoding and different probabilities of false alarms respectively, and the adoption of CRCs with a same length will bring waste of control signaling resources.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for dynamic scheduling, wherein the method includes the following steps.

Step A: detecting a first bit block in a first time-frequency resource set.

Step B: detecting a second bit block in a second time-frequency resource set.

Herein, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2.

In one embodiment, the above method has the following benefits: the first bit block corresponds to a first-stage DCI, and the second bit block corresponds to a second-stage DCI. Since the second-stage DCI is associated with the first-stage DCI, a probability of false alarms corresponding to the second-stage DCI is relatively low, and the second-stage DCI employs a shorter CRC check bit, or the second-stage DCI does not include a CRC part. The above method reduces overheads of control signalings in the two-stage DCI, thus improving overall spectrum efficiency.

In one embodiment, the second bit block includes a third bit sub-block and a fourth bit sub-block, the third bit sub-block is used for generating the fourth bit sub-block, and a number of bits in the fourth bit sub-block is K2.

In one embodiment, the second bit block includes a third bit sub-block, and the third bit sub-block does not include CRC bits.

In one embodiment, the phrase that the first bit block and the second bit block are associated includes at least one of the following:

the first bit block and the second bit block are used for one time of downlink grant;

the first bit block and the second bit block are used for one time of uplink grant; and the first bit block is used for detecting the second bit block.

In one embodiment, the first bit block and the second bit block include one DCI respectively.

In one subembodiment, the dynamic control information is transmitted through the DCI.

In one embodiment, the K1 is equal to one of {8, 16, 24, 32}.

In one embodiment, the K2 is equal to one of {4, 8, 16}.

In one embodiment, the phrase that the second bit block includes a third bit sub-block and the third bit sub-block does not include CRC bits refers that: the second bit block includes the dynamic control information only, and the second bit block does not include CRC bits.

In one embodiment, the second bit sub-block is a CRC of the first bit sub-block.

In one embodiment, the second bit sub-block is a bit block after a CRC bit block of the first bit sub-block is processed through scrambling.

In one subembodiment of the above two embodiments, the second bit sub-block is an output of the first bit sub-block being processed through a CRC cyclic generator polynomial. A polynomial formed by the first bit sub-block and the second bit sub-block is divisible by the CRC cyclic generator polynomial on GF(2), that is to say, the polynomial formed by the first bit sub-block and the second bit sub-block is divided by the CRC cyclic generator polynomial to obtain a remainder of zero.

In one subembodiment, a scrambling sequence employed by the scrambling is related to a given identifier.

In one affiliated embodiment of the above subembodiment, the given identifier is a Cell Radio Network Temporary Identifier (C-RNTI) of the UE.

In one affiliated embodiment of the above subembodiment, the given identifier is a Physical Cell Identifier (PCI) of a base station serving the UE.

In one affiliated embodiment of the above subembodiment, the given identifier is related to an index corresponding to a beam transmitting the first radio signal.

In one affiliated embodiment of the above subembodiment, the given identifier is related to an index corresponding to a beam group transmitting the first radio signal.

In one embodiment, the fourth bit sub-block is a CRC of the third bit sub-block.

In one embodiment, the fourth bit sub-block is a bit block after a CRC bit block of the third bit sub-block is processed through scrambling.

In one subembodiment of the above two embodiments, the fourth bit sub-block is an output of the third bit sub-block being processed through a CRC cyclic generator polynomial. A polynomial formed by the third bit sub-block and the fourth bit sub-block is divisible by the CRC cyclic generator polynomial on GF(2), that is to say, the polynomial formed by the third bit sub-block and the fourth bit sub-block is divided by the CRC cyclic generator polynomial to obtain a remainder of zero.

In one subembodiment, a scrambling sequence employed by the scrambling is related to a given identifier.

In one affiliated embodiment of the above subembodiment, the given identifier is a C-RNTI of the UE.

In one affiliated embodiment of the above subembodiment, the given identifier is a PCI of a base station serving the UE.

In one affiliated embodiment of the above subembodiment, the given identifier is related to an index corresponding to a beam transmitting the first radio signal.

In one affiliated embodiment of the above subembodiment, the given identifier is related to an index corresponding to a beam group transmitting the first radio signal.

In one embodiment, the second bit sub-block is unrelated to a bit other than the first bit sub-block.

In one embodiment, the fourth bit sub-block is unrelated to a bit other than the third bit sub-block.

Specifically, according to one aspect of the disclosure, the Step A further includes the following Step A0, and the Step B further includes the following Step B0.

Step A0: receiving a first radio signal, and performing first-type channel decoding.

Step B0: receiving a second radio signal, and performing second-type channel decoding.

Herein, the first-type channel decoding corresponds to first-type channel coding, and the second-type channel decoding corresponds to second-type channel coding. The first-type channel coding and the second-type channel coding are both based on polar code. The first bit block and the second bit block are an input of the first-type channel coding and an input of the second-type channel coding respectively.

In one embodiment, the above method has the following benefits: control signalings introduces polar code to improve performances.

In one embodiment, the first radio signal and the second radio signal are both transmitted on a physical layer control channel (that is, a physical layer channel incapable of carrying data).

In one subembodiment, the physical layer control channel is a Physical Downlink Control Channel (PDCCH).

In one subembodiment, the physical layer control channel is an Enhanced PDCCH (EPDCCH).

In one subembodiment, the physical layer control channel is a New Radio PDCCH (N-PDCCH).

In one subembodiment, the physical layer control channel is a Short Latency PDCCH (SPDCCH).

In one embodiment, channel capacities corresponding to sub-channels to which the bits in the first bit block are mapped decrease in turn, and channel capacities corresponding to sub-channels to which the bits in the second bit block are mapped decrease in turn.

In one embodiment, the sub-channel refers to a position in an input bit sequence of an Arikan polar encoder.

In one subembodiment, an output obtained by multiplying the input bit sequence and a polar encoding matrix is an output of corresponding channel coding. The polar encoding matrix is obtained from a product of a bit reversal permutation matrix and a first matrix, the first matrix is an n-order Kronecker power of a kernel matrix, the n is a logarithmic base 2 of a length of the input bit sequence, the kernel matrix is a two-line two-column matrix, two elements in the first line are 1 and 0 respectively, and two elements in the second line are both 1.

In one subembodiment, the channel capacity corresponding to sub-channel refers to an upper limit of information rate of reliable transmission on the sub-channel.

In one embodiment, sub-channel indexes corresponding to sub-channels to which the bits in the first bit block are mapped decrease in turn, and sub-channel indexes corresponding to sub-channels to which the bits in the second bit block are mapped decrease in turn.

In one subembodiment, the sub-channel index refers to: an index of a given sub-channel in a given sub-channel set. The given sub-channel is any sub-channel in the given sub-channel set. The given sub-channel set refers to all sub-channels to which the bits in the first bit block are mapped; or the given sub-channel set refers to all sub-channels to which the bits in the second bit block are mapped.

In one embodiment, the above two embodiments have the following benefits: bit blocks corresponding to information bits are mapped according to the size of sub-channel capacity, the encoding characteristics of polar code are maximized, and the robustness and performances of control signalings are improved.

In one embodiment, the first radio signal is UE specific.

In one embodiment, the second radio signal is UE specific.

In one embodiment, the first radio signal is beam specific.

In one embodiment, the second radio signal is beam specific.

In one embodiment, the first radio signal is beam-group specific.

In one embodiment, the second radio signal is beam-group specific.

In one embodiment, the first radio signal indicates a DCI format corresponding to the second radio signal.

In one embodiment, the first radio signal indicates the second time-frequency resource set.

In one embodiment, an input of the first-type channel coding includes all bits in the first bit block or all bits in a third bit block. Values of all bits in the third bit block are preset.

In one subembodiment, all bits in the third bit block are 0.

In one embodiment, an input of the second-type channel coding includes all bits in the second bit block or all bits in a fourth bit block. Values of all bits in the fourth bit block are preset.

In one subembodiment, all bits in the fourth bit block are 0.

Specifically, according to one aspect of the disclosure, the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

In one embodiment, the above method has the following benefits: two CRCs are designed for the first bit sub-block, which correspond to a first CRC and a second CRC respectively. The first CRC is used for check, and the second CRC is used for pruning when decoding. This scheme improves performances when decoding polar code, thereby enhancing the robustness of control signalings.

In one embodiment, the above method has another following benefit: in view of the features that the number of times of blind decoding of the second-stage DCI is reduced and the probability of false alarms is low, only one CRC is designed for the third bit sub-block, that is, a third CRC. The third CRC is used for check or pruning when decoding. This scheme improves the transmission efficiency of control signalings without reducing performances.

In one embodiment, the second bit sub-block is the first CRC and the second CRC.

In one embodiment, the fourth bit sub-block is the third CRC.

In one embodiment, the first bit group is the first bit sub-block. A number of bits in the second bit group is less than a number of bits in the first bit sub-block.

In one embodiment, the first bit group is contiguous in position in the first bit block.

In one embodiment, the first CRC is used for determining in the first-type channel decoding whether the first bit block is correctly decoded.

In one subembodiment, the first CRC is an output of the first bit group being processed through a CRC cyclic generator polynomial. A polynomial formed by the first bit group and the first CRC is divisible by the CRC cyclic generator polynomial on GF(2), that is to say, the polynomial formed by the first bit group and the first CRC is divided by the CRC cyclic generator polynomial to obtain a remainder of zero.

In one embodiment, the first CRC indicates an identifier of the UE.

In one embodiment, the second CRC is used for pruning in the first-type channel decoding.

In one embodiment, the second CRC is used for reducing search survivor paths in the first-type channel decoding based on Viterbi rules.

In one embodiment, the second CRC bit is a bit used for pruning. For a given second CRC bit, a bit corresponding to a pruned search path and the given second CRC bit are associated.

In one subembodiment, for a given second CRC bit, a bit corresponding to a pruned search path is used for generating the given second CRC bit.

In one subembodiment, for a given second CRC bit, a summation of bits corresponding to a pruned search path is modulo 2 to obtain the second CRC bit.

In one subembodiment, for a given second CRC bit, a summation of bits corresponding to a pruned search path is modulo 2 and then performs an exclusive OR(XOR) operation with corresponding bits in a scrambling sequence to obtain the second given CRC bit.

In one embodiment, at least two bits in the second CRC are not contiguous in position in the first bit block.

In one embodiment, any two bits in the second CRC are not contiguous in position in the first bit block.

In one embodiment, the third bit group is the third bit sub-block.

In one embodiment, a number of bits in the third bit group is less than a number of bits in the third bit sub-block.

In one embodiment, any two bits in the fourth bit sub-block are not contiguous in position in the second bit block.

In one embodiment, the third CRC is used for determining in the second-type channel decoding whether the second bit block is correctly decoded.

In one subembodiment, the third CRC is an output of the third bit group being processed through a CRC cyclic generator polynomial. A polynomial formed by the third bit group and the third CRC is divisible by the CRC cyclic generator polynomial on GF(2), that is to say, the polynomial formed by the third bit group and the third CRC is divided by the CRC cyclic generator polynomial to obtain a remainder of zero.

In one embodiment, the third CRC indicates an identifier of the UE.

In one embodiment, the third CRC is used for pruning in the second-type channel decoding.

In one embodiment, the third CRC is used for reducing search survivor paths in the second-type channel decoding based on Viterbi rules.

In one embodiment, the third CRC bit is a bit used for pruning. For a given third CRC bit, a bit corresponding to a pruned search path and the given third CRC bit are associated.

In one subembodiment, for a given third CRC bit, a bit corresponding to a pruned search path is used for generating the given third CRC bit.

In one subembodiment, for a given third CRC bit, a summation of bits corresponding to a pruned search path is modulo 2 to obtain the third CRC bit.

In one subembodiment, for a given third CRC bit, a summation of bits corresponding to a pruned search path is modulo 2 and then performs an XOR operation with corresponding bits in a scrambling sequence to obtain the third given CRC bit.

Specifically, according to one aspect of the disclosure, the method further includes the following step.

Step C: operating a third radio signal.

Herein, the operating is receiving, or the operating is transmitting. The dynamic control information includes at least one of occupied time-domain resources, occupied frequency-domain resources, an employed Modulation and Coding Status (MCS), a New Data Indicator (NDI), an employed Redundancy Version (RV) or a Hybrid Automatic Repeat reQuest (HARQ) process number corresponding to the third radio signal.

In one embodiment, the above method is characterized in that: the third radio signal is scheduled by the first bit block and the second bit block simultaneously.

In one embodiment, the dynamic control information is a downlink grant, and the operating is receiving.

In one embodiment, the dynamic control information is an uplink grant, and the operating is transmitting.

In one embodiment, a transport channel corresponding to the third radio signal is a Downlink Shared Channel (DL-SCH).

In one embodiment, a transport channel corresponding to the third radio signal is an Uplink Shared Channel (UL-SCH).

In one embodiment, a physical layer channel corresponding to the third radio signal is a Physical Downlink Shared Channel (PDSCH) or a Short Latency PDSCH (sPDSCH).

In one embodiment, a physical layer channel corresponding to the third radio signal is a Physical Uplink Shared Channel (PUSCH) or a Short Latency PUSCH (sPUSCH).

Specifically, according to one aspect of the disclosure, the Step A further includes the following step.

Step A10: receiving first information.

Herein, the first information is used for determining the first time-frequency resource set.

In one embodiment, the above method is characterized in that: the first information is used for indicating the first time-frequency resource set, and the first time-frequency resource set corresponds to a search space of the first radio signal. The above method configures the search space corresponding to the first-stage DCI more flexibly, thereby configuring time-frequency resources used for transmitting control information in the system more flexibly.

In one embodiment, the first time-frequency resource set is a search space of the first radio signal.

In one embodiment, the first bit block is used for determining the second time-frequency resource set.

In one subembodiment, the first bit block indicates explicitly at least one of time-domain resources occupied by the second time-frequency resource set or frequency-domain resources occupied by the second time-frequency resource set.

In one subembodiment, the first bit block indicates implicitly at least one of time-domain resources occupied by the second time-frequency resource set or frequency-domain resources occupied by the second time-frequency resource set.

In one embodiment, the first bit block and the first information together determine the second time-frequency resource set.

In one subembodiment, the first information is used for determining a third time-frequency resource set, and the first bit block indicates the second time-frequency resource set from the third time-frequency resource set.

In one affiliated embodiment of the above subembodiment, the first information indicates explicitly at least one of time-domain resources occupied by the third time-frequency resource set or frequency-domain resources occupied by the third time-frequency resource set.

Specifically, according to one aspect of the disclosure, the UE performs a maximum number of M1 times of detections of the first bit block in the first time-frequency resource set, and the UE performs a maximum number of M2 time(s) of detection(s) of the second bit block in the second time-frequency resource set. The M1 is a positive integer, and the M2 is a positive integer less than the M1.

In one embodiment, the above method has the following benefits: M1 times of detections correspond to blind decoding of the first bit block, M2 time(s) of detection(s) correspond(s) to blind decoding of the second bit block. The number of times of blind decoding of the second bit block is less than the number of times of blind decoding of the first bit block, thereby reducing complexity of implementation of two-stage DCI scheduling.

In one embodiment, the M1 times of detections correspond to M1 RE sets in the first time-frequency resource set respectively; the M2 time(s) of detection(s) correspond(s) to M2 RE set(s) in the second time-frequency resource set respectively; and the RE set includes a positive integer number of REs.

In one embodiment, the RE in the disclosure includes one subcarrier in frequency domain and one multicarrier symbol in time domain.

In one subembodiment, the multicarrier symbol is an OFDM symbol.

In one subembodiment, the multicarrier symbol is a Filtering Bank Multile Carrier (FBMC) symbol.

In one subembodiment, the multicarrier symbol is a Single Carrier Frequency Division Multiple Access (SC-FDMA) symbol.

In one embodiment, at least two of the M1 RE sets include different numbers of REs.

In one embodiment, at least two of the M1 RE sets are the same (that is, they are composed of same REs).

In one embodiment, any two of the M2 RE sets are different.

In one embodiment, all of the M2 RE sets include a same number of REs.

In one subembodiment, the first bit block is used for determining at least one of a number of REs included in the RE set among the M2 RE sets, the M2 RE sets or a number of bits in the second bit block.

In one embodiment, the M2 is 1.

The disclosure provides a method in a base station for dynamic scheduling, wherein the method includes the following steps.

Step A: configuring a first bit block in a first time-frequency resource set.

Step B: configuring a second bit block in a second time-frequency resource set.

Herein, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2.

Specifically, according to one aspect of the disclosure, the Step A further includes the following Step A0, and the Step B further includes the following Step B0.

Step A0: performing first-type channel coding, and transmitting a first radio signal.

Step B0: performing second-type channel coding, and transmitting a second radio signal.

Herein, the first-type channel coding and the second-type channel coding are both based on polar code. The first bit block and the second bit block are an input of the first-type channel coding and an input of the second-type channel coding respectively.

Specifically, according to one aspect of the disclosure, the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

Specifically, according to one aspect of the disclosure, the method further includes the following step.

Step C: processing a third radio signal.

Herein, the processing is transmitting, or the processing is receiving. The dynamic control information includes at least one of occupied time-domain resources, occupied frequency-domain resources, an employed MCS, an NDI, an employed RV or a HARQ process number corresponding to the third radio signal.

Specifically, according to one aspect of the disclosure, the Step A further includes the following step.

Step A10: transmitting first information.

Herein, the first information is used for determining the first time-frequency resource set.

Specifically, according to one aspect of the disclosure, a first node performs a maximum number of M1 times of detections of the first bit block in the first time-frequency resource set, and the first node performs a maximum number of M2 time(s) of detection(s) of the second bit block in the second time-frequency resource set. The M1 is a positive integer, and the M2 is a positive integer less than the M1. The first node is a detector of the first bit block and the second bit block.

In one embodiment, the first node is one UE.

The disclosure provides a UE for dynamic scheduling, wherein the UE includes:

a first receiver, to detect a first bit block in a first time-frequency resource set; and a second receiver, to detect a second bit block in a second time-frequency resource set.

Herein, the first bit block and the second bit block both include dynamic control information; the first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2.

In one embodiment, the above UE for dynamic scheduling further includes:

a first transceiver, to operate a third radio signal.

Herein, the to operate is to receive, or the to operate is to transmit. The dynamic control information includes at least one of occupied time-domain resources, occupied frequency-domain resources, an employed MCS, an NDI, an employed RV or a HARQ process number corresponding to the third radio signal.

In one embodiment, the above UE for dynamic scheduling is characterized in that: the first receiver is further to receive a first radio signal and perform first-type channel decoding. The second receiver is further to receive a second radio signal and perform second-type channel decoding. The first-type channel decoding corresponds to first-type channel coding, and the second-type channel decoding corresponds to second-type channel coding. The first-type channel coding and the second-type channel coding are both based on polar code. The first bit block and the second bit block are an input of the first-type channel coding and an input of the second-type channel coding respectively.

In one embodiment, the above UE for dynamic scheduling is characterized in that: the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

In one embodiment, the above UE for dynamic scheduling is characterized in that: the first receiver is further to receive first information. The first information is used for determining the first time-frequency resource set.

In one embodiment, the above UE for dynamic scheduling is characterized in that: the UE performs a maximum number of M1 times of detections of the first bit block in the first time-frequency resource set, and the UE performs a maximum number of M2 time(s) of detection(s) of the second bit block in the second time-frequency resource set. The M1 is a positive integer, and the M2 is a positive integer less than the M1.

The disclosure provides a base station for dynamic scheduling, wherein the base station includes:

a first transmitter, to configure a first bit block in a first time-frequency resource set; and a second transmitter, to configure a second bit block in a second time-frequency resource set.

Herein, the first bit block and the second bit block both include dynamic control information; the first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2.

In one embodiment, the above base station for dynamic scheduling further includes:

a second transceiver, to execute a third radio signal.

Herein, the to execute is to transmit, or the to execute is to receive. The dynamic control information includes at least one of occupied time-domain resources, occupied frequency-domain resources, an employed MCS, an NDI, an employed RV or a HARQ process number corresponding to the third radio signal.

In one embodiment, the above base station for dynamic scheduling is characterized in that: the first transmitter is further to perform first-type channel coding and transmit a first radio signal. The second transmitter is further to perform second-type channel coding and transmit a second radio signal. The first-type channel coding and the second-type channel coding are both based on polar code. The first bit block and the second bit block are an input of the first-type channel coding and an input of the second-type channel coding respectively.

In one embodiment, the above base station for dynamic scheduling is characterized in that: the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

In one embodiment, the above base station for dynamic scheduling is characterized in that: the first transmitter is further to transmit first information. The first information is used for determining the first time-frequency resource set.

In one embodiment, the above base station for dynamic scheduling is characterized in that: a first node performs a maximum number of M1 times of detections of the first bit block in the first time-frequency resource set, and the first node performs a maximum number of M2 time(s) of detection(s) of the second bit block in the second time-frequency resource set. The M1 is a positive integer, and the M2 is a positive integer less than the M1. The first node is a receiver of the first bit block and the second bit block.

In one subembodiment, the receiver is one UE.

In one embodiment, compared with the prior art, the disclosure has the following technical advantages.

The number of CRC check bits corresponding to the second-stage DCI in a two-stage DCI is reduced, and the transmission efficiency of control signalings is improved.

One bit sub-block generates two CRCs, one of which is used for check and the other is used for pruning when decoding, thereby improving the transmission performance of control signalings based on polar code.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
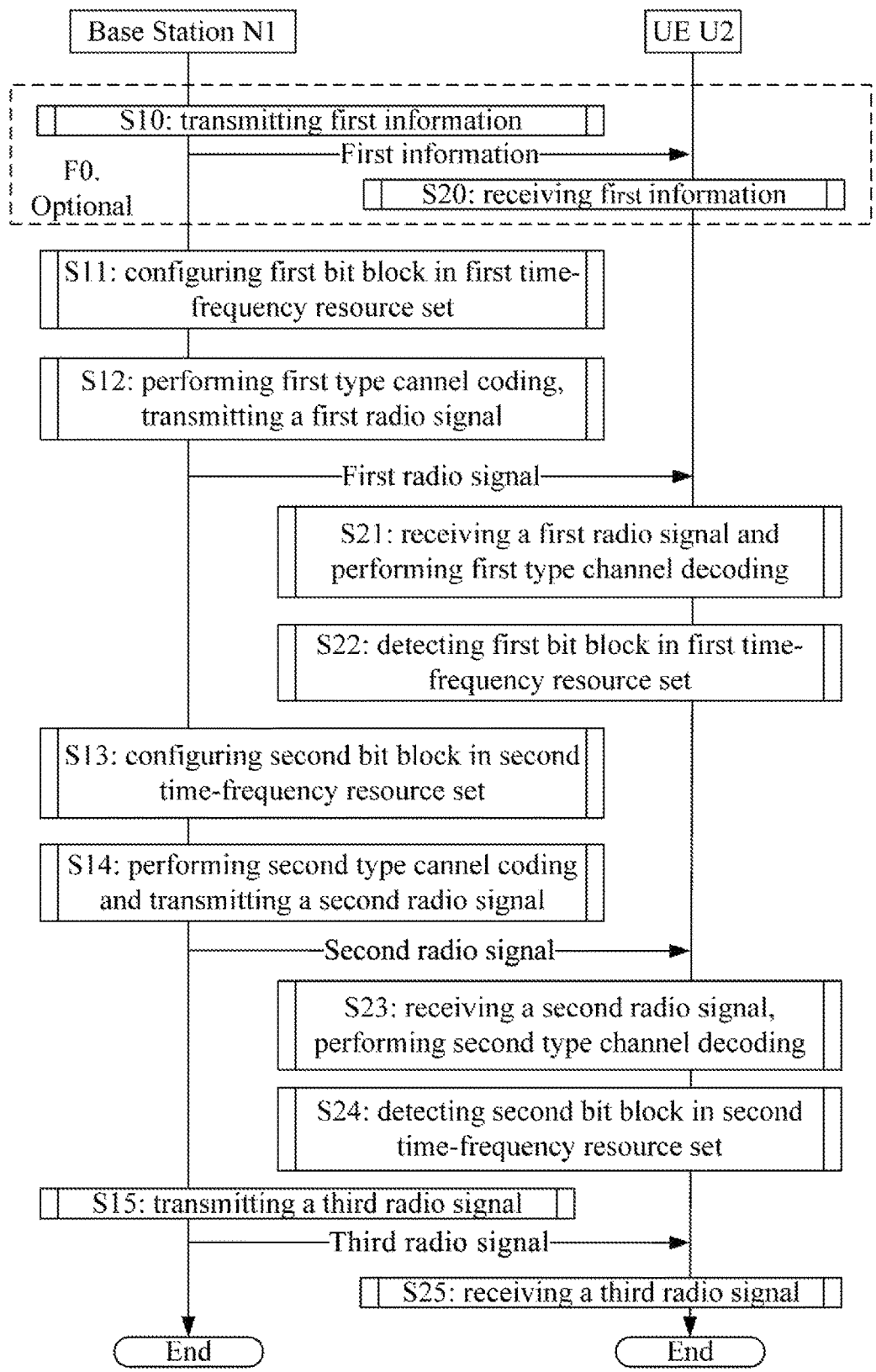
FIG. 1 is a flowchart of downlink transmission according to one embodiment of the disclosure.

Embodiment 1 illustrates an example of a flowchart of downlink transmission, as shown in FIG. 1. In FIG. 1, a base station N1 is a maintenance base station for a serving cell of a UE U2. Steps in box F0 are optional.

The base station N1 transmits first information in S10, configures a first bit block in a first time-frequency resource set in S11, performs first-type channel coding and transmits a first radio signal in S12, configures a second bit block in a second time-frequency resource set in S13, performs second-type channel coding and transmits a second radio signal in S14, and transmits a third radio signal in S15.

The UE U2 receives first information in S20, receives a first radio signal and performs first-type channel decoding in S21, detects a first bit block in a first time-frequency resource set in S22, receives a second radio signal and performs second-type channel decoding in S23, detects a second bit block in a second time-frequency resource set in S24, and receives a third radio signal in S25.

In Embodiment 1, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2. The first-type channel decoding corresponds to first-type channel coding, and the second-type channel decoding corresponds to second-type channel coding. The first-type channel coding and the second-type channel coding are both based on polar code. The first bit block and the second bit block are an input of the first-type channel coding and an input of the second-type channel coding respectively. The second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block. The dynamic control information includes at least one of occupied time-domain resources, occupied frequency-domain resources, an employed MCS, an NDI, an employed RV or a HARQ process number corresponding to the third radio signal. The first information is used for determining the first time-frequency resource set. The UE performs a maximum number of M1 times of detections of the first bit block in the first time-frequency resource set, and the UE performs a maximum number of M2 time(s) of detection(s) of the second bit block in the second time-frequency resource set. The M1 is a positive integer, and the M2 is a positive integer less than the M1.

In one subembodiment, the first information is transmitted through an RRC layer signaling.

In one affiliated embodiment of the above subembodiment, the RRC layer signaling is cell specific.

In one affiliated embodiment of the above subembodiment, the RRC layer signaling is beam specific.

In one affiliated embodiment of the above subembodiment, the RRC layer signaling is beam-group specific.

In one affiliated embodiment of the above subembodiment, the RRC layer signaling is UE specific.

In one subembodiment, the first information is transmitted through a broadcast signaling.

Embodiment 2

Figure 2:
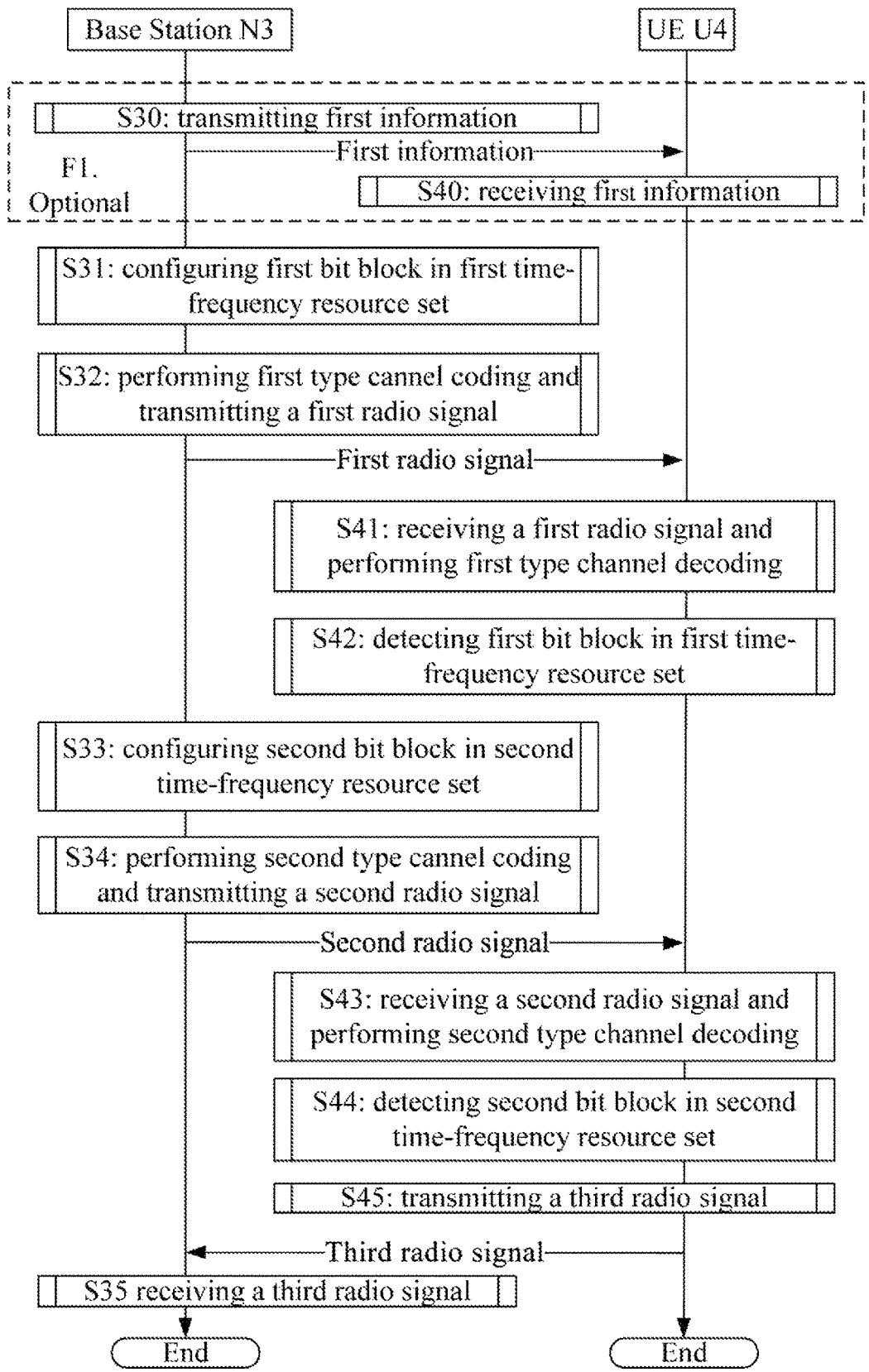
FIG. 2 is a flowchart of uplink transmission according to one embodiment of the disclosure.

Embodiment 2 illustrates an example of a flowchart of uplink transmission, as shown in FIG. 2. In FIG. 2, a base station N3 is a maintenance base station for a serving cell of a UE U4. Steps in box F1 are optional.

The base station N3 transmits first information in S30, configures a first bit block in a first time-frequency resource set in S31, performs first-type channel coding and transmits a first radio signal in S32, configures a second bit block in a second time-frequency resource set in S33, transmits a second radio signal and performs second-type channel coding in S34, and receives a third radio signal in S35.

The UE U4 receives first information in S40, receives a first radio signal and performs first-type channel decoding in S41, detects a first bit block in a first time-frequency resource set in S42, receives a second radio signal and performs second-type channel decoding in S43, detects a second bit block in a second time-frequency resource set in S44, and transmits a third radio signal in S45.

In Embodiment 2, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2. The first-type channel decoding corresponds to first-type channel coding, and the second-type channel decoding corresponds to second-type channel coding. The first-type channel coding and the second-type channel coding are both based on polar code. The first bit block and the second bit block are an input of the first-type channel coding and an input of the second-type channel coding respectively. The second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block. The dynamic control information includes at least one of occupied time-domain resources, occupied frequency-domain resources, an employed MCS, an NDI, an employed RV or a HARQ process number corresponding to the third radio signal. The first information is used for determining the first time-frequency resource set. The UE performs a maximum number of M1 times of detections of the first bit block in the first time-frequency resource set, and the UE performs a maximum number of M2 time(s) of detection(s) of the second bit block in the second time-frequency resource set. The M1 is a positive integer, and the M2 is a positive integer less than the M1.

In one subembodiment, the first information is transmitted through an RRC layer signaling.

In one affiliated embodiment of the above subembodiment, the RRC layer signaling is cell specific.

In one affiliated embodiment of the above subembodiment, the RRC layer signaling is beam specific.

In one affiliated embodiment of the above subembodiment, the RRC layer signaling is beam-group specific.

In one affiliated embodiment of the above subembodiment, the RRC layer signaling is UE specific.

In one subembodiment, the first information is transmitted through a broadcast signaling.

Embodiment 3

Figure 3:
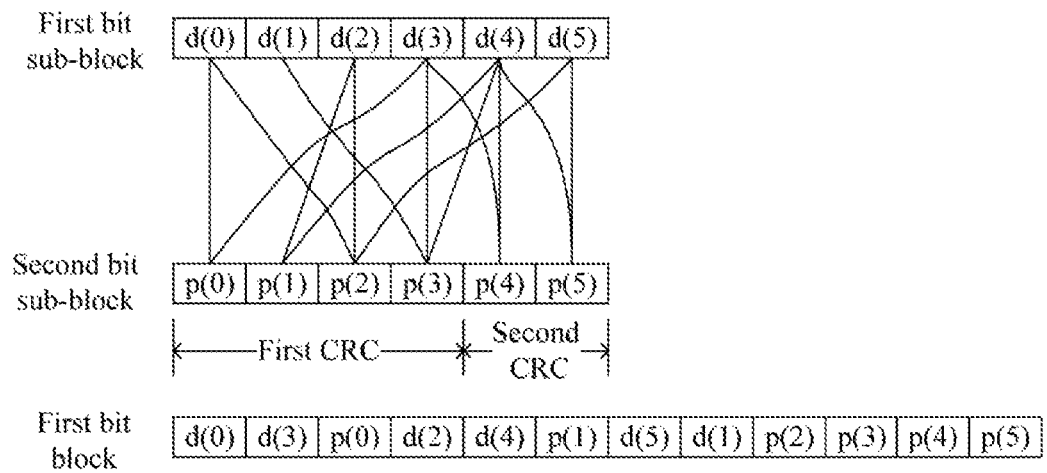
FIG. 3 is a diagram illustrating a first bit block according to one embodiment of the disclosure.

Embodiment 3 illustrates an example of a diagram of a first bit block according to one embodiment of the disclosure, as shown in FIG. 3. In FIG. 3, the first bit block includes a first bit sub-block and a second bit sub-block. The first bit sub-block is used for generating the second bit sub-block. The second bit sub-block includes a first CRC and a second CRC. All bits in the first bit sub-block are used for generating the first CRC, and partial bits in the first bit sub-block are used for generating the second CRC. The first bit sub-block and the second bit sub-block include P1 and P2 binary bits respectively, wherein the P1 and the P2 are positive integers respectively. The first CRC includes P3 binary bits, and the second CRC includes P4 binary bits. In FIG. 3, the P1 is equal to 6, the P2 is equal to 6, the P3 is equal to 4 and the P4 is equal to 2. The bit in the first bit sub-block is expressed as $d(i)$, wherein the i is an integer greater than or equal to 0 but less than P1; the bit in the second bit sub-block is expressed as $p(j)$, wherein the j is an integer greater than or equal to 0 but less than P2. In FIG. 3 associated bits are connected through solid lines. Bits $d(0)$ to $d(5)$ shown in FIG. 3 correspond to a first bit group, and bits $d(6)$ to $d(7)$ shown in FIG. 3 correspond to a second bit group.

In one subembodiment, for any bit in the second bit sub-block, the any bit is equal to a summation of a positive integer number of bits in the first bit sub-block modulo 2. For example, in FIG. 3 $p(0)$ is equal to a summation of $d(0)$ and $d(3)$ modulo 2.

In one subembodiment, for any bit in the second bit sub-block, the any bit is obtained after a summation of a positive integer number of bits in the first bit sub-block is modulo 2 and then performs an XOR operation with corresponding bits in a scrambling sequence. For example, in FIG. 3, $p(0)$ is obtained after a summation of $d(0)$ and $d(3)$ is modulo 2 and then performs an XOR operation with corresponding bits in a scrambling sequence.

In one subembodiment, the first bit sub-block is unrelated to a bit other than the second bit sub-block.

In one subembodiment, bits in the second bit sub-block are arranged sequentially in the first bit block according to a number of associated bits in the first bit sub-block.

In one subembodiment, the first CRC is used for determining whether the first bit block is correctly decoded.

In one subembodiment, the second CRC is used for pruning when decoding the first bit block.

Embodiment 4

Figure 4:
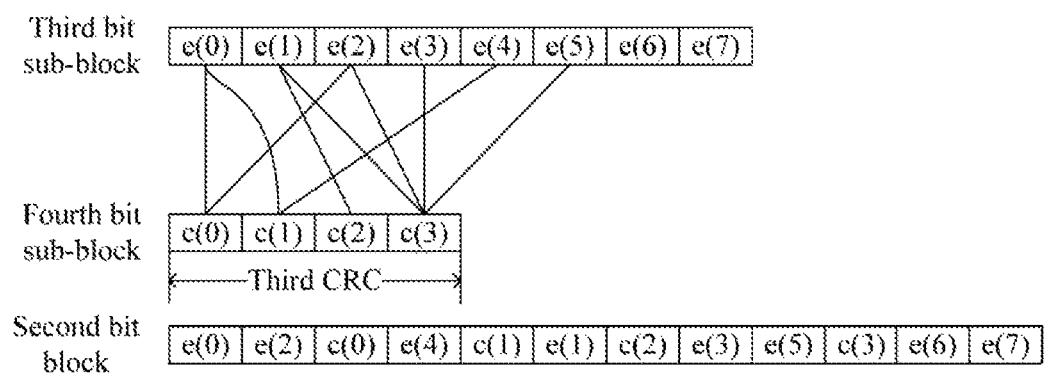
FIG. 4 is a diagram illustrating a second bit block according to one embodiment of the disclosure.

Embodiment 4 illustrates an example of a diagram of a second bit block according to one embodiment of the disclosure, as shown in FIG. 4. In FIG. 4, the second bit block includes a third bit sub-block and a fourth bit sub-block. The third bit sub-block is used for generating the fourth bit sub-block. The fourth bit sub-block includes a third CRC. Partial bits in the third bit sub-block are used for generating the third CRC. The third bit sub-block and the fourth bit sub-block include Q1 and Q2 binary bits respectively, wherein the Q1 and the Q2 are positive integers respectively. The third CRC is the fourth bit sub-block. In FIG. 4, the Q1 is equal to 8, and the Q2 is equal to 4. The bit in the third bit sub-block is expressed as $e(i)$, wherein the i is an integer greater than or equal to 0 but less than Q1; the bit in the fourth bit sub-block is expressed as $c(j)$, wherein the j is an integer greater than or equal to 0 but less than Q2.

In FIG. 4 associated bits are connected through solid lines. Bits e(0) to e(5) shown in FIG. 4 correspond to a third bit group.

In one subembodiment, for any bit in the fourth bit sub-block, the any bit is equal to a summation of a positive integer number of bits in the third bit sub-block modulo 2. For example, in FIG. 4 c(0) is equal to a summation of e(0) and e(3) modulo 2.

In one subembodiment, for any bit in the fourth bit sub-block, the any bit is obtained after a summation of a positive integer number of bits in the third bit sub-block is modulo 2 and then performs an XOR operation with corresponding bits in a scrambling sequence. For example, in FIG. 4, c(0) is obtained after a summation of e(0) and e(3) is modulo 2 and then performs an XOR operation with corresponding bits in a scrambling sequence.

In one subembodiment, the third bit sub-block is unrelated to a bit other than the fourth bit sub-block.

In one subembodiment, bits in the fourth bit sub-block are arranged sequentially in the second bit block according to a number of associated bits in the third bit sub-block.

In one subembodiment, the third CRC is used for determining whether the second bit block is correctly decoded.

In one subembodiment, the third CRC is used for pruning when decoding the second bit block.

Embodiment 5

Figure 5:
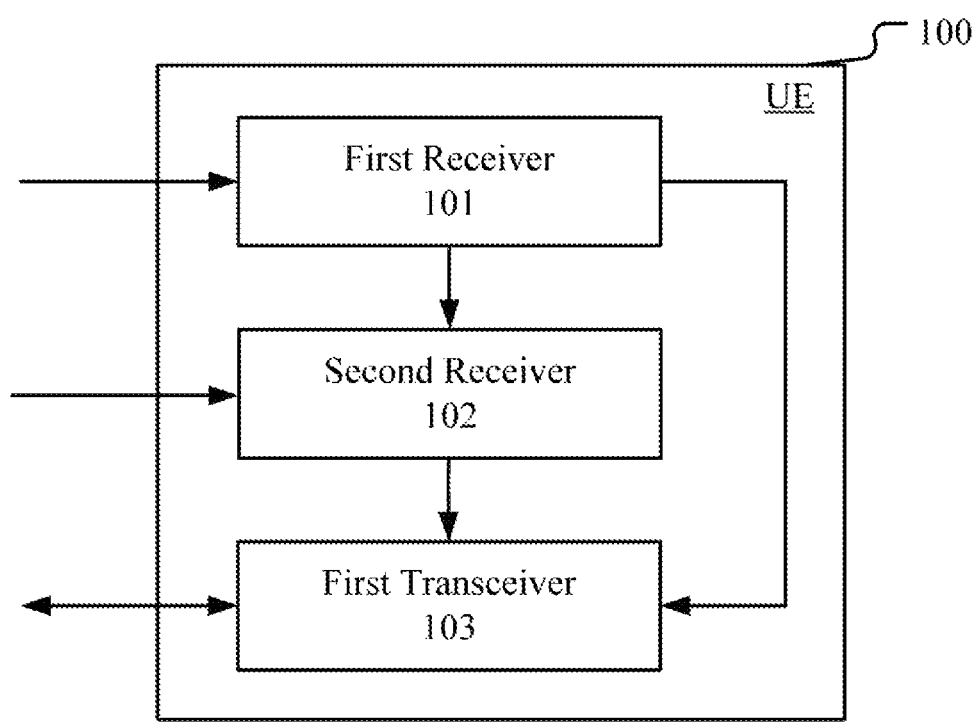
FIG. 5 is a structure block diagram illustrating a processing device in a UE according to one embodiment of the disclosure.

Embodiment 5 illustrates an example of a structure block diagram of a processing device in a UE, as shown in FIG. 5. In FIG. 5, the processing device 100 in the UE includes a first receiver 101, a second receiver 102 and a first transceiver 103.

The first receiver 101 is to detect a first bit block in a first time-frequency resource set.

The second receiver 102 is to detect a second bit block in a second time-frequency resource set.

The first transceiver 103 is to operate a first radio signal.

In Embodiment 5, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated.

The K1 and the K2 are both positive integers. The K1 is greater than the K2. The to operate is to receive, or the to operate is to transmit. The dynamic control information includes at least one of occupied time-domain resources, occupied frequency-domain resources, an employed MCS, an NDI, an employed RV or a HARQ process number corresponding to the third radio signal.

In one subembodiment, the first receiver 101 is further to receive a first radio signal and perform first-type channel decoding. The second receiver 102 is further to receive a second radio signal and perform second-type channel decoding. The first-type channel decoding corresponds to first-type channel coding, and the second-type channel decoding corresponds to second-type channel coding. The first-type channel coding and the second-type channel coding are both based on polar code. The first bit block and the second bit block are an input of the first-type channel coding and an input of the second-type channel coding respectively.

In one subembodiment, the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

In one subembodiment, the first receiver 101 is further to receive first information. The first information is used for determining the first time-frequency resource set.

In one subembodiment, the UE performs a maximum number of M1 times of detections of the first bit block in the first time-frequency resource set, and the UE performs a maximum number of M2 time(s) of detection(s) of the second bit block in the second time-frequency resource set. The M1 is a positive integer, and the M2 is a positive integer less than the M1.

Embodiment 6

Figure 6:
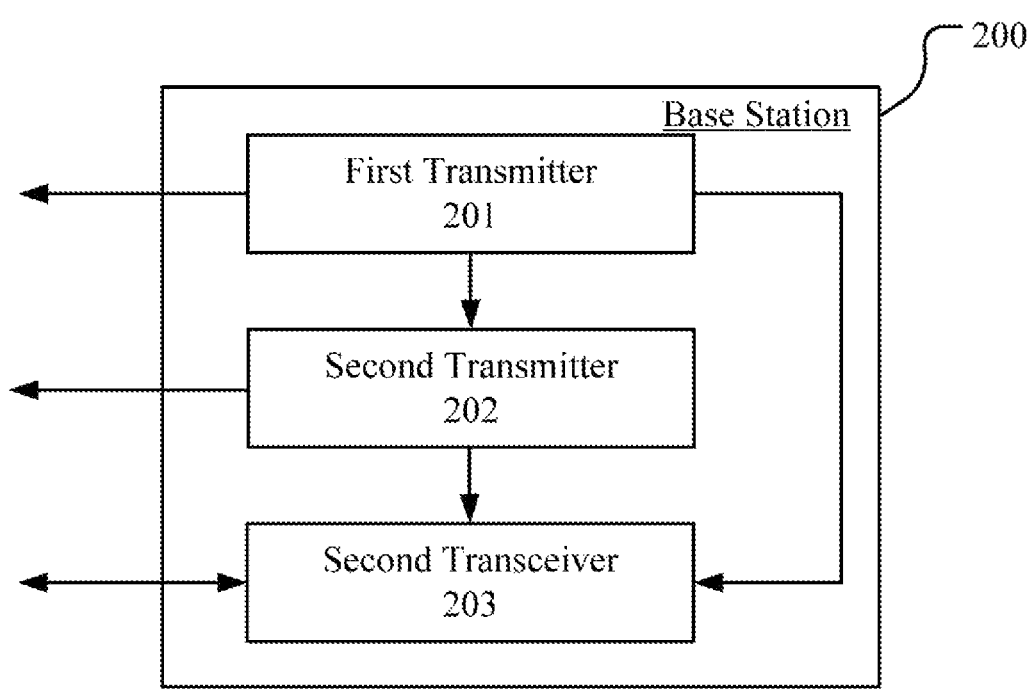
FIG. 6 is a structure block diagram illustrating a processing device in a base station according to one embodiment of the disclosure.

Embodiment 6 illustrates an example of a structure block diagram of a processing device in a base station, as shown in FIG. 6. In FIG. 6, the processing device 200 in the base station includes a first transmitter 201, a second transmitter 202 and a second transceiver 203.

The first transmitter 201 is to configure a first bit block in a first time-frequency resource set.

The second transmitter 202 is to configure a second bit block in a second time-frequency resource set.

The second transceiver 203 is to execute a third radio signal.

In Embodiment 6, the first bit block and the second bit block both include dynamic control information. The first bit block includes a first bit sub-block and a second bit sub-block, the first bit sub-block is used for generating the second bit sub-block, and a number of bits in the second bit sub-block is K1. The second bit block includes a third bit sub-block and a fourth bit sub-block, the third bit sub-block is used for generating the fourth bit sub-block, and a number of bits in the fourth bit sub-block is K2; or the second bit block includes a third bit sub-block, and the third bit sub-block does not include CRC bits. The first bit block and the second bit block are associated. The K1 and the K2 are both positive integers. The K1 is greater than the K2. The to execute is to transmit, or the to execute is to receive. The dynamic control information includes at least one of occupied time-domain resources, occupied frequency-domain resources, an employed MCS, an NDI, an employed RV or a HARQ process number corresponding to the third radio signal.

In one subembodiment, the first transmitter 201 is further to perform first-type channel coding and transmit a first radio signal. The second transmitter 202 is further to perform second-type channel coding and transmit a second radio signal. The first-type channel coding and the second-type channel coding are both based on polar code. The first bit block and the second bit block are an input of the first-type channel coding and an input of the second-type channel coding respectively.

In one subembodiment, the second bit sub-block includes a first CRC and a second CRC, the first CRC and the second CRC correspond to a first bit group and a second bit group respectively, and the first bit group and the second bit group are both composed of bits in the first bit sub-block. The fourth bit sub-block includes a third CRC, the third CRC corresponds to a third bit group, and the third bit group is composed of bits in the third bit sub-block.

In one subembodiment, the first transmitter 201 is further to transmit first information. The first information is used for determining the first time-frequency resource set.

In one subembodiment, a first node performs a maximum number of M1 times of detections of the first bit block in the first time-frequency resource set, and the first node performs a maximum number of M2 time(s) of detection(s) of the second bit block in the second time-frequency resource set. The M1 is a positive integer, and the M2 is a positive integer less than the M1. The first node is a receiver of the first bit block and the second bit block.

In one affiliated embodiment of the above subembodiment, the receiver is one UE.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each unit in the above embodiment may be realized in the form of hardware, or in the form of software function modules. The disclosure is not limited to any combination of hardware and software in specific forms. The UE and terminal in the present disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other wireless communication equipment. The base station in the disclosure includes but not limited to macro-cellular base stations, micro-cellular base stations, home base stations, relay base station, and other wireless communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for dynamic scheduling, comprising:
   detecting a first bit block in a first time-frequency resource set; and
   detecting a second bit block in a second time-frequency resource set;
   operating a third radio signal, or, receiving first information;
   wherein the first bit block and the second bit block both comprise dynamic control information; the first bit block comprises a first bit sub-block and a second bit sub-block, the first bit sub-block is used for generating the second bit sub-block, and a number of bits in the second bit sub-block is K1; the K1 is a positive integer; the second bit block comprises a third bit sub-block and a fourth bit sub-block, or the second bit block comprises a third bit sub-block and does not comprise a fourth bit sub-block; when the second bit block comprises the third bit sub-block and the fourth bit sub-block, the third bit sub-block is used for generating the fourth bit sub-block, and a number of bits in the fourth bit sub-block is K2, the K2 is a positive integer and the K1 is greater than the K2; when the second bit block comprises the third bit sub-block and does not comprise the fourth bit sub-block, the third bit sub-block does not comprise Cyclic Redundancy Check (CRC) bits; the first bit block and the second bit block are associated;
   wherein the operating is receiving, or the operating is transmitting; the dynamic control information comprises at least one of occupied time-domain resources, occupied frequency-domain resources, an employed Modulation and Coding Status (MCS), a New Data Indicator (NDI), an employed Redundancy Version (RV) or a Hybrid Automatic Repeat reQuest (HARQ) process number corresponding to the third radio signal; the first information is used for determining the first time-frequency resource set.

2. The method according to claim 1, wherein a third radio signal is scheduled by the first bit block and the second bit block simultaneously.

3. The method according to claim 1, comprising:
   receiving a first radio signal, and performing first-type channel decoding; and
   receiving a second radio signal, and performing second-type channel decoding;
   wherein the first-type channel decoding corresponds to first-type channel coding, and the second-type channel decoding corresponds to second-type channel coding; the first-type channel coding and the second-type channel coding are both based on polar code; and the first bit block and the second bit block are an input of the first-type channel coding and an input of the second-type channel coding respectively.

4. The method according to claim 1, wherein the second bit sub-block comprises a first CRC and a second CRC, the first CRC and the second CRC correspond to a first bit group and a second bit group respectively, and the first bit group and the second bit group are both composed of bits in the first bit sub-block; the fourth bit sub-block comprises a third CRC, the third CRC corresponds to a third bit group, and the third bit group is composed of bits in the third bit sub-block;
   or, the UE performs a maximum number of M1 times of detections of the first bit block in the first time-frequency resource set, and the UE performs a maximum number of M2 time(s) of detection(s) of the second bit block in the second time-frequency resource set; the M1 is a positive integer, and the M2 is a positive integer less than the M1.

5. A method in a base station for dynamic scheduling, comprising:
   configuring a first bit block in a first time-frequency resource set; and
   configuring a second bit block in a second time-frequency resource set;
   processing a third radio signal, or, transmitting first information;
   wherein the first bit block and the second bit block both comprise dynamic control information; the first bit block comprises a first bit sub-block and a second bit sub-block, the first bit sub-block is used for generating the second bit sub-block, and a number of bits in the second bit sub-block is K1; the K1 is positive integer; the second bit block comprises a third bit sub-block and a fourth bit sub-block, or the second bit block comprises a third bit sub-block and does not comprise a fourth bit sub-block; when the second bit block comprises the third bit sub-block and the fourth bit sub-block, the third bit sub-block is used for generating the fourth bit sub-block, and a number of bits in the fourth bit sub-block is K2, the K2 is a positive integer and the K1 is greater than the K2; when the second bit block comprises the third bit sub-block and does not comprise the fourth bit sub-block, the third bit sub-block does not comprise CRC bits; the first bit block and the second bit block are associated;

wherein the processing is transmitting, or the processing is receiving; the dynamic control information comprises at least one of occupied time-domain resources, occupied frequency-domain resources, an employed MCS, an NDI, an employed RV or a HARQ process number corresponding to the third radio signal; the first information is used for determining the first time-frequency resource set.

6. The method according to claim 5, wherein a third radio signal is scheduled by the first bit block and the second bit block simultaneously.

7. The method according to claim 5, comprising:
performing first-type channel coding, and transmitting a first radio signal; and
performing second-type channel coding, and transmitting a second radio signal;
wherein the first-type channel coding and the second-type channel coding are both based on polar code; and the first bit block and the second bit block are an input of the first-type channel coding and an input of the second-type channel coding respectively.

8. The method according to claim 5, wherein the second bit sub-block comprises a first CRC and a second CRC, the first CRC and the second CRC correspond to a first bit group and a second bit group respectively, and the first bit group and the second bit group are both composed of bits in the first bit sub-block; the fourth bit sub-block comprises a third CRC, the third CRC corresponds to a third bit group, and the third bit group is composed of bits in the third bit sub-block;
or, a first node performs a maximum number of M1 times of detections of the first bit block in the first time-frequency resource set, and the first node performs a maximum number of M2 time(s) of detection(s) of the second bit block in the second time-frequency resource set; the M1 is a positive integer, and the M2 is a positive integer less than the M1; and the first node is a detector of the first bit block and the second bit block.

9. A UE for dynamic scheduling, comprising:
a first receiver, to detect a first bit block in a first time-frequency resource set; and
a second receiver, to detect a second bit block in a second time-frequency resource set;
a first transceiver, to operate a third radio signal; or the first receiver receives first information;
wherein the first bit block and the second bit block both comprise dynamic control information; the first bit block comprises a first bit sub-block and a second bit sub-block, the first bit sub-block is used for generating the second bit sub-block, and a number of bits in the second bit sub-block is K1; the K1 is a positive integer; the second bit block comprises a third bit sub-block and a fourth bit sub-block, or the second bit block comprises a third bit sub-block and does not comprise a fourth bit sub-block; when the second bit block comprises the third bit sub-block and the fourth bit sub-block, the third bit sub-block is used for generating the fourth bit sub-block, and a number of bits in the fourth bit sub-block is K2, the K2 is a positive integer and the K1 is greater than the K2; when the second bit block comprises a third bit sub-block and does not comprise the fourth bit sub-block, the third bit sub-block does not comprise CRC bits; the first bit block and the second bit block are associated;

wherein the to operate is to receive, or the to operate is to transmit the dynamic control information comprises at least one of occupied time-domain resources, occupied frequency-domain resources, an employed MCS, an NDI, an employed RV or a HARQ process number corresponding to the third radio signal; the first information is used for determining the first time-frequency resource set.

10. The UE according to claim 9, wherein a third radio signal is scheduled by the first bit block and the second bit block simultaneously.

11. The UE according to claim 9, wherein the first receiver receives a first radio signal and performs first-type channel decoding, and the second receiver receives a second radio signal and performs second-type channel decoding; the first-type channel decoding corresponds to first-type channel coding, and the second-type channel decoding corresponds to second-type channel coding; the first-type channel coding and the second-type channel coding are both based on polar code; and the first bit block and the second bit block are an input of the first-type channel coding and an input of the second-type channel coding respectively.

12. The UE according to claim 9, wherein the second bit sub-block comprises a first CRC and a second CRC, the first CRC and the second CRC correspond to a first bit group and a second bit group respectively, and the first bit group and the second bit group are both composed of bits in the first bit sub-block; the fourth bit sub-block comprises a third CRC, the third CRC corresponds to a third bit group, and the third bit group is composed of bits in the third bit sub-block;
or, the UE performs a maximum number of M1 times of detections of the first bit block in the first time-frequency resource set, and the UE performs a maximum number of M2 time(s) of detection(s) of the second bit block in the second time-frequency resource set; the M1 is a positive integer, and the M2 is a positive integer less than the M1.

13. A base station for dynamic scheduling, comprising:
a first transmitter, to configure a first bit block in a first time-frequency resource set; and
a second transmitter, to configure a second bit block in a second time-frequency resource set;
a second transceiver, to process a third radio signal; or the first transmitter transmits first information;
wherein the first bit block and the second bit block both comprise dynamic control information; the first bit block comprises a first bit sub-block and a second bit sub-block, the first bit sub-block is used for generating the second bit sub-block, and a number of bits in the second bit sub-block is K1; the K1 is a positive integer; the second bit block comprises a third bit sub-block and a fourth bit sub-block, or the second bit block comprises a third bit sub-block and does not comprise a fourth bit sub-block; when the second bit block comprises a third bit sub-block and a fourth bit sub-block, the third bit sub-block is used for generating the fourth bit sub-block, and a number of bits in the fourth bit sub-block is K2, the K2 is a positive integer and the K1 is greater than the K2; when the second bit block comprises the third bit sub-block and does not comprise the fourth bit sub-block, the third bit sub-block does not comprise CRC bits; the first bit block and the second bit block are associated;

wherein the to process is to transmit, or the to process is to receive; the dynamic control information comprises at least one of occupied time-domain resources, occupied frequency-domain resources, an employed MCS, an NDI, an employed RV or a HARQ process number corresponding to the third radio signal; the first information is used for determining the first time-frequency resource set.

14. The base station according to claim 13, wherein a third radio signal is scheduled by the first bit block and the second bit block simultaneously.

15. The base station according to claim 13, wherein the first transmitter performs first-type channel coding and transmits a first radio signal, and the second transmitter performs second-type channel coding and transmits a second radio signal; the first-type channel coding and the second-type channel coding are both based on polar code; and the first bit block and the second bit block are an input of the first-type channel coding and an input of the second-type channel coding respectively.

16. The base station according to claim 13, wherein the second bit sub-block comprises a first CRC and a second CRC, the first CRC and the second CRC correspond to a first bit group and a second bit group respectively, and the first bit group and the second bit group are both composed of bits in the first bit sub-block; the fourth bit sub-block comprises a third CRC, the third CRC corresponds to a third bit group, and the third bit group is composed of bits in the third bit sub-block;

or, a first node performs a maximum number of M1 times of detections of the first bit block in the first time-frequency resource set, and the first node performs a maximum number of M2 time(s) of detection(s) of the second bit block in the second time-frequency resource set; the M1 is a positive integer, and the M2 is a positive integer less than the M1; and the first node is a detector of the first bit block and the second bit block.

* * * * *